US 7,835,425 B1

(12) United States Patent
Sutardja et al.

(10) Patent No.: US 7,835,425 B1
(45) Date of Patent: Nov. 16, 2010

(54) ARCHITECTURES, CIRCUITS, SYSTEMS AND METHODS FOR REDUCING LATENCY IN DATA COMMUNICATIONS

(75) Inventors: Pantas Sutardja, San Jose, CA (US); Lei Wu, Sunnyvale, CA (US); Hongying Sheng, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 12/330,218

(22) Filed: Dec. 8, 2008

Related U.S. Application Data

(62) Division of application No. 10/634,218, filed on Aug. 4, 2003, now Pat. No. 7,486,718.

(51) Int. Cl.
*H03K 11/00* (2006.01)
*H04L 25/60* (2006.01)
*H04L 25/64* (2006.01)

(52) U.S. Cl. ............... 375/215; 375/376; 375/373; 375/327; 455/180.3

(58) Field of Classification Search ........... 455/180.3; 375/376, 215, 294, 327, 373
See application file for complete search history.

(56) References Cited

U.S. PATENT DOCUMENTS

| 5,822,383 | A  | * | 10/1998 | Muntz et al. ............... 375/362 |
| 6,513,085 | B1 |   | 1/2003  | Gugel et al. |
| 6,888,379 | B2 | * | 5/2005  | Takeo et al. .................. 327/3 |
| 6,982,974 | B1 |   | 1/2006  | Saleh et al. |
| 7,050,777 | B2 |   | 5/2006  | Cai |
| 7,088,976 | B2 |   | 8/2006  | Gregorius et al. |

(Continued)

FOREIGN PATENT DOCUMENTS

DE 101 50 536 A1 4/2003

OTHER PUBLICATIONS

Peter Gregorius and Torsten Hinz; "Device for Reconstructing Data from a Received Data Signal and Corresponding Transceiver"; esp@cenet; Abstract of Publication No. DE10150536 A1; Publication Date: Apr. 30, 2003; esp@cenet Database—Worldwide.

*Primary Examiner*—Ted M Wang

(57) ABSTRACT

Circuits, architectures, systems and methods for facilitating data communications and/or reducing latency in data communications. The architecture includes a clock recovery loop receiving data from a host device and providing a recovered clock signal, a filter circuit receiving recovered clock signal information and providing a control signal that adjusts the transmitter clock in response to recovered clock signal information and the two clock signals, and a transmitter receiving the control signal and transmitting data to a destination device in accordance with the transmitter clock. The circuitry generally includes a clock alignment block receiving first and second periodic signals and providing a control signal in response thereto, a filter for first periodic signal information, and a logic circuit configured to combine the control signal and the filtered information, thereby providing an adjustment signal for the second periodic signal. The systems generally relate to those that include the present architecture and/or circuit. The method generally includes determining a phase difference between first and second periodic signals, one of the periodic signals being recovered from a data stream; adjusting the other periodic signal in response to the phase difference and filtered information from the recovered periodic signal; and transmitting the data stream in accordance with said adjusted periodic signal. The present invention advantageously eliminates a FIFO memory in the data path, thereby reducing transceiver latency and improving system performance.

25 Claims, 4 Drawing Sheets

U.S. PATENT DOCUMENTS

| | | | |
|---|---|---|---|
| 7,194,059 B2 * | 3/2007 | Wong et al. | 375/377 |
| 7,295,644 B1 | 11/2007 | Wu et al. | |
| 2003/0016734 A1 | 1/2003 | Blake | |
| 2003/0034849 A1 | 2/2003 | Sanduleanu | |
| 2003/0074511 A1 | 4/2003 | Kramer et al. | |
| 2004/0071389 A1 | 4/2004 | Hofmeister et al. | |
| 2005/0063494 A1 | 3/2005 | Gregorius et al. | |

* cited by examiner

ARCHITECTURES, CIRCUITS, SYSTEMS AND METHODS FOR REDUCING LATENCY IN DATA COMMUNICATIONS

RELATED APPLICATIONS

This application is a divisional of U.S. patent application Ser. No. 10/634,218, filed on Aug. 4, 2003, pending, which is incorporated herein by reference in its entirety.

FIELD OF THE INVENTION

The present invention generally relates to the field of data communications. More specifically, embodiments of the present invention pertain to architectures, circuitry, systems and methods for reducing latency in data communications.

DISCUSSION OF THE BACKGROUND

FIG. 1 shows a conventional repeater architecture 10. Repeater 10 is configured to receive and transmit serial data streams between two clock domains in a network. Host 20 is the source of a serial data stream DATA, and device 30 is the destination of the serial data stream DATA. Host 20 operates in a first clock domain having a first frequency $f_1$, repeater 10 operates in a second clock domain having a second frequency $f_2$, and device 30 operates in a third clock domain having a third frequency $f_3$.

Repeater 10 generally includes a first receiver 12 for receiving serial data stream DATA from host 20, a first transmitter 14 for transmitting serial data stream DATA to device 30, and a first-in-first-out (FIFO) memory or elastic buffer 16 for buffering the serial data stream between receiver 12 and transmitter 14. Repeater 10 also generally includes a second receiver 22 for receiving a second serial data stream from another source (i.e., a host or device, including device 30, other than host 20) and a second transmitter 24 for transmitting the second serial data stream to another destination (i.e., a host or device, including host 20, other than device 30).

Receiver 12 generally includes a clock data recovery circuit, decoding circuitry and serial-to-parallel data conversion circuitry. Transmitter 14, on the other hand, generally includes encoding circuitry, parallel-to-serial data conversion circuitry and a transmitter clock for transmitting data to an external destination. Elastic buffer 16 has a first write port (and associated data writing circuitry) configured to write data received from receiver 12 into memory cells in the elastic buffer at a first internal frequency. Elastic buffer 16 also has a first read port (and associated data reading circuitry) configured to read data from memory cells in the elastic buffer at a second internal frequency, which is generally about the same as the first internal frequency.

Data transmitted across conventional serial transmission media (e.g., copper wire, optical fiber) having a certain minimum length is reasonably likely to have some jitter. In some cases, the jitter in the incoming data stream may cause glitches, false data, incorrect processing operations (such as incorrect clock recovery adjustments), and other data transmission errors. In such cases, a clock signal recovered from the incoming data stream also has jitter that is carried forward, reproduced or otherwise incorporated from the jitter in the incoming data stream. However (and at least in part to minimize the jitter introduced into a data stream by transmission media), transmitter 14 generally transmits data using a "clean," or substantially jitter-free clock signal. Thus, unless repeater/transceiver 10 is configured to remove such jitter or reduce its effects, data communications using the repeater/transceiver 10 may be unacceptably error-prone. Thus, conventional approaches to generating a "clean" transmitter clock signal have generally tried to keep the transmitter clock and the recovered clock somewhat independent of each other. For example, even when the transmitter clock and the recovered clock have the same nominal frequency in a given application, to minimize any jitter that may be propagated by the recovered clock, designers sometimes lock the transmitter clock to (and/or adjust the transmitter clock with reference to) a third clock (although the third clock be adjusted with respect to the recovered clock). Thus, elastic buffer 16 not only temporarily stores data during data transfer across time domains (including from a "jittery" clock domain to a "clean" clock domain), but in effect, can also buffer any phase and/or frequency difference between the two different clock domains.

However, elastic buffer 16 generally requires a number of clock cycles to store and retrieve data, thus introducing latency into the data communication path in the repeater 10. Furthermore, the memory cells in elastic buffer 16 generally must be stored and retrieved in blocks, typically of a multiple of 8 bits (e.g., 8, 16, 32 or 64 bits). This structure in the FIFO memory array necessitates deserializer and serializer circuitry in the receiver and transmitter, respectively. Deserializer and serializer circuitry uses rows or banks of latches or registers for temporary storage of data as it is converted from one form to another, thereby introducing further latency into data communications through repeater 10.

As is known in the art, latency increases the overall time for data communications and reduces throughput (i.e., bits per second sent through the repeater). Under certain conditions and/or in certain applications, the latency introduced by elastic buffer 16, receiver 12 and transmitter 14 may be unacceptably high. Therefore, a need exists to reduce latency in high-speed repeaters.

SUMMARY OF THE INVENTION

Embodiments of the present invention relate to architectures, circuitry, systems and methods for facilitating and/or reducing latency in data transfer operations. The architecture generally comprises (a) a clock recovery loop receiving data from a host device and providing a recovered clock signal, (b) a low pass filter configured to filter recovered clock signal information and provide a transmitter clock adjustment signal that adjusts the transmitter clock in response to the (filtered) recovered clock signal information and a difference between the recovered clock signal and a transmitter clock signal, and (c) a transmitter communicatively coupled to the low pass filter, configured to receive the transmitter clock adjustment signal and transmit the data to a destination device in accordance with (or in response to) the transmitter clock signal. The circuitry generally comprises (i) a clock alignment block configured to receive first and second periodic signals and provide a data transfer control signal in response thereto; (ii) a first filter circuit configured to receive first periodic signal information and provide a filtered clock information signal in response thereto; and (iii) a logic circuit configured to mathematically combine the data transfer control signal and the filtered clock information signal and provide an adjustment signal for the second periodic signal in response thereto. The systems generally comprise those systems that include an architecture and/or a circuit embodying one or more of the inventive concepts disclosed herein. The method generally comprises the steps of (1) determining a phase difference between a first periodic signal and a second periodic signal, the first periodic signal being recovered from a data stream; (2) adjusting the second periodic signal in response to the phase difference and filtered information from the first periodic signal; and (3) transmitting the data stream in accordance with (or in response to) the adjusted second periodic signal.

The present invention advantageously reduces the number of clock cycles required for data to be transmitted and/or repeated from one device to another. By eliminating a FIFO, the invention also reduces any need for complex FIFO logic circuitry, such as fullness flags, look-ahead logic, etc.

These and other advantages of the present invention will become readily apparent from the detailed description of preferred embodiments below.

DETAILED DESCRIPTION OF THE PREFERRED EMBODIMENTS

Figure 1:
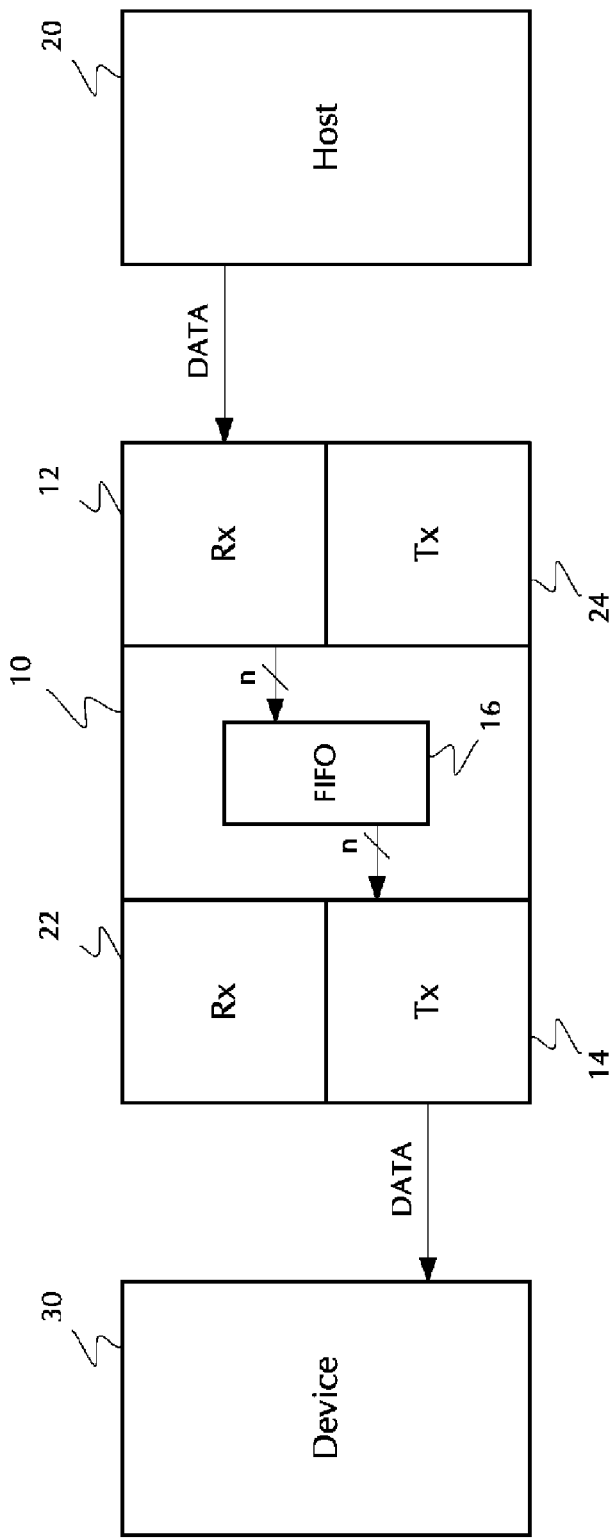
FIG. 1 is a diagram showing a conventional serial transceiver architecture for receiving and transmitting serial data streams between two clock domains.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of processes, procedures, logic blocks, functional blocks, processing, and other symbolic representations of operations on data bits, data streams or waveforms within a computer, processor, controller and/or memory. These descriptions and representations are generally used by those skilled in the data processing arts to effectively convey the substance of their work to others skilled in the art. A process, procedure, logic block, function, process, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like.

It should be borne in mind, however, that all of these and similar terms are associated with the appropriate physical quantities and are merely convenient labels applied to these quantities. Unless specifically stated otherwise and/or as is apparent from the following discussions, it is appreciated that throughout the present application, discussions utilizing terms such as "processing," "operating," "computing," "calculating," "determining," "manipulating," "transforming," "displaying" or the like, refer to the action and processes of a computer or data processing system, or similar processing device (e.g., an electrical, optical, or quantum computing or processing device), that manipulates and transforms data represented as physical (e.g., electronic) quantities. The terms refer to actions and processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture.

Furthermore, for the sake of convenience and simplicity, the terms "clock," "time," "rate," "period" and "frequency" (and grammatical variations thereof) are generally used interchangeably herein, but are generally given their art-recognized meanings. Also, for convenience and simplicity, the terms "data," "data stream," "waveform" and "information" may be used interchangeably, as may the terms "connected to," "coupled with," "coupled to" and "in communication with" (all of which may connote a direct or indirect relationship), and the terms "transmit," "transfer," "communicate" and "repeat" (and grammatical variations thereof), but these terms are also generally given their art-recognized meanings. Also, in the context of the present application, the phrases "in accordance with" and "in response to" may be used interchangeably and generally have their art-recognized meanings, but "in response to" generally implies a direct relationship, whereas "in accordance with" generally implies a direct or indirect relationship.

The present invention concerns a repeater and/or multiplexer architecture for data communications, generally comprising (a) a clock recovery loop receiving data from a host device and providing a recovered clock signal, (b) a low pass filter configured to filter recovered clock signal information and provide a transmitter clock adjustment signal that adjusts the transmitter clock in response to the (filtered) recovered clock signal information and a difference between the recovered clock signal and a transmitter clock signal, and (c) a transmitter communicatively coupled to the low pass filter, configured to receive the transmitter clock adjustment signal and transmit the data to a destination device in accordance with (or in response to) the transmitter clock signal.

A further aspect of the present invention concerns a circuit for facilitating data transfer operations, generally comprising (i) a clock alignment block configured to receive first and second periodic signals and provide a data transfer control signal in response thereto; (ii) a first filter circuit configured to receive first periodic signal information and provide a filtered clock information signal in response thereto; and (iii) a logic circuit configured to mathematically combine the data transfer control signal and the filtered clock information signal and provide an adjustment signal for the second periodic signal in response thereto.

An even further aspect of the invention concerns a method of facilitating data communications, generally comprising the steps of (1) determining a phase difference between a first periodic signal and a second periodic signal, the first periodic signal being recovered from a data stream; (2) adjusting the second periodic signal in response to the phase difference and filtered information from the first periodic signal; and (3) transmitting the data stream in accordance with (or in response to) the adjusted second periodic signal.

Even further aspects of the invention concern systems embodying the inventive concepts described herein, that generally include the present architecture and/or circuit, and/or that practice the present method. The invention, in its various aspects, will be explained in greater detail below with regard to exemplary embodiments.

An Exemplary Architecture

In one aspect, the present invention concerns a repeater and/or multiplexer architecture that generally includes (a) a clock recovery loop receiving data from a host device and providing a recovered clock signal, (b) a low pass filter configured to filter recovered clock signal information and provide a transmitter clock adjustment signal that adjusts the transmitter clock in response to the (filtered) recovered clock signal information and a difference between the recovered clock signal and a transmitter clock signal, and (c) a transmitter communicatively coupled to the low pass filter, configured to receive the transmitter clock adjustment signal and transmit the data to a destination device in accordance with the transmitter clock signal. In this arrangement, the present architecture avoids any need for a FIFO memory to buffer data between the receiver and the transmitter. By omitting a FIFO buffer, the present architecture reduces latency in data communication operations by at least two clock cycles, a significant improvement over the architecture of FIG. 1.

Figure 2:
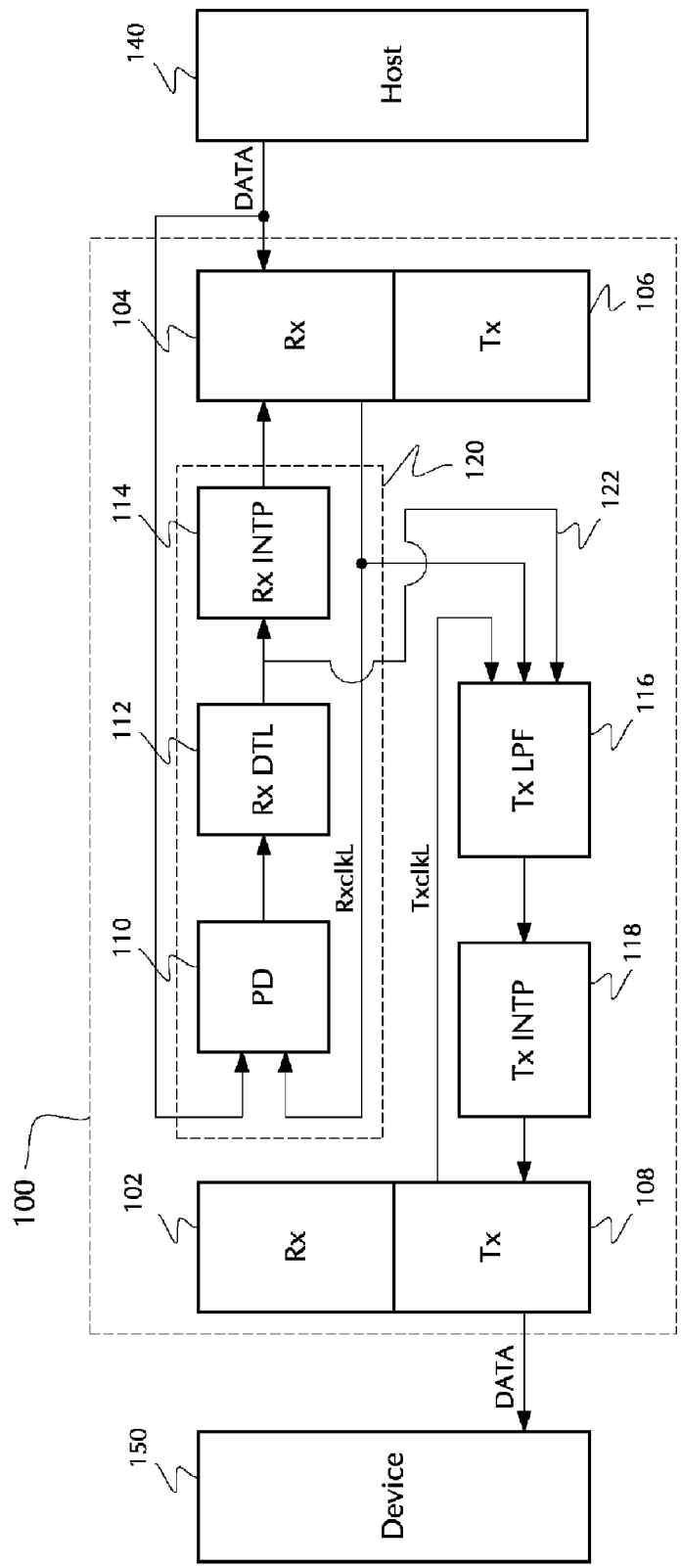
FIG. 2 is a block diagram of an embodiment of the present invention.

Referring now to FIG. 2, an exemplary repeater and/or transceiver architecture 100 is shown. Transceiver 100 is configured to transfer data between first and second devices (e.g., from host or source device 140 to destination device 150). Transceiver 100 generally includes first and second receivers 102 and 104, first and second transmitters 106 and 108, phase detector 110, receiver digital timing loop 112, receiver interpolator 114, transmitter low pass filter 116 and transmitter interpolator 118. Phase detector 110, receiver digital timing loop 112, and receiver interpolator 114 are part of a clock recovery circuit 120 that, in combination with certain elements of receiver 104 (e.g., a phase detector that receives both a received data stream DATA and the output of receiver interpolator 114), also form a timing loop that may be configured to recover a periodic signal (or "clock") from the incoming data stream DATA.

As shown in FIG. 2, receiver 104 receives incoming data DATA from a host device 140 and provides a recovered clock signal RxclkL Receiver 104 is conventional, and operates in accordance with conventional techniques and methodology. Recovered clock signal RxclkL is input into phase detector 110 and low pass filter 116. Phase detector 110, which may be located in receiver block 104, is configured to determine at least a phase difference between the recovered clock signal RxclkL and incoming data stream DATA. Phase detector 110 may also determine a frequency difference between the recovered clock signal RxclkL and data stream DATA. In this embodiment, recovered clock signal RxclkL generally comprises the output of interpolator 114. Alternatively, phase detector 110 may receive a reference signal REF instead of data stream DATA. Reference signal REF may be a reference clock signal generated by an internal or external phase locked loop (PLL), crystal oscillator, or other source of a stable periodic signal (e.g., having a relatively constant frequency and/or amplitude).

Upon determining a phase and/or frequency difference between recovered clock signal RxclkL and reference clock signal REF, digital timing loop 112 processes phase and/or frequency difference information output from phase detector 110 and provides a recovered clock adjustment signal 122 in response thereto. Such phase and/or frequency difference information may be digital or analog, and if digital, it may be single-bit or multi-bit. In one implementation, the phase and/or frequency difference information comprises a single-bit, three-state signal (e.g., having a value of 1, 0 or −1). Furthermore, recovered clock adjustment signal 122 may also be digital or analog, and if digital, it may be single-bit or multi-bit. Preferably, recovered clock adjustment signal 122 is a multi-bit digital signal.

Digital timing loop 112 operates on phase and/or frequency difference information using conventional digital or analog signal processing circuitry, techniques and/or methodology, depending on the digital or analog nature of the phase and/or frequency difference information. Exemplary digital timing loops are described in detail in copending U.S. application Ser. No. 10/619,278, filed Jul. 14, 2003, the relevant portion(s) of which are incorporated herein by reference. In exemplary implementations, digital timing loop 112 comprises a plurality of phase- and/or frequency-adjusting paths, each such path comprising a filter, each such frequency-adjusting path further comprising a frequency tracking circuit (e.g., an integrator), and the outputs of such paths generally being combined by one or more adders. The recovered clock signal information 122 may be taken from any node or nodes in digital timing loop 112 (e.g., one or more filter outputs, frequency tracking circuit outputs and/or adder outputs), but most preferably, recovered clock signal information 122 is taken from the output of the digital timing loop 112, and recovered clock signal information 122 contains both phase information and frequency information. Thus, digital timing loop 112 is one exemplary implementation of a recovered clock adjustment circuit that is configured to adjust the recovered clock signal in response to a phase and/or frequency difference between the recovered clock signal and either the reference clock signal or incoming data stream.

The recovered clock adjustment signal 122 is received by receiver interpolator 114 and low pass filter 116. Receiver interpolator 114 is one exemplary implementation of a recovered clock signal generating circuit that is adjusted by digital timing loop 112. Receiver interpolator 114 is conventional, and operates in accordance with conventional techniques and methodology. Generally, in response to an appropriate adjustment signal, an interpolator selects one of multiple available phases of a reference clock configured to have a frequency equal to or about the frequency of the incoming data stream received by receiver 104. However, an interpolator may be replaced in the present architecture by a conventional voltage- or current-controlled oscillator (in which case the recovered clock adjustment signal may be an analog signal) or other circuit configured to generate an adjustable periodic signal.

As described above, low pass filter 116 is configured to filter the recovered clock signal RxclkL and provide a transmitter clock adjustment signal that adjusts the transmitter clock in response to a difference between recovered clock signal RxclkL and a transmitter clock signal TxclkL. In the present architecture, low pass filter 116 may be configured to (i) reduce jitter in the recovered clock signal and/or (ii) filter the recovered clock adjustment signal. Conventional low pass filters that are generally effective at removing undesired frequencies from digital waveforms may be generally suitable for use in the present architecture. However, the present inventors have developed an inventive filter circuit for this purpose (and others). An exemplary filter circuit, which is shown in FIG. 3, is discussed in greater detail below.

Figure 3:
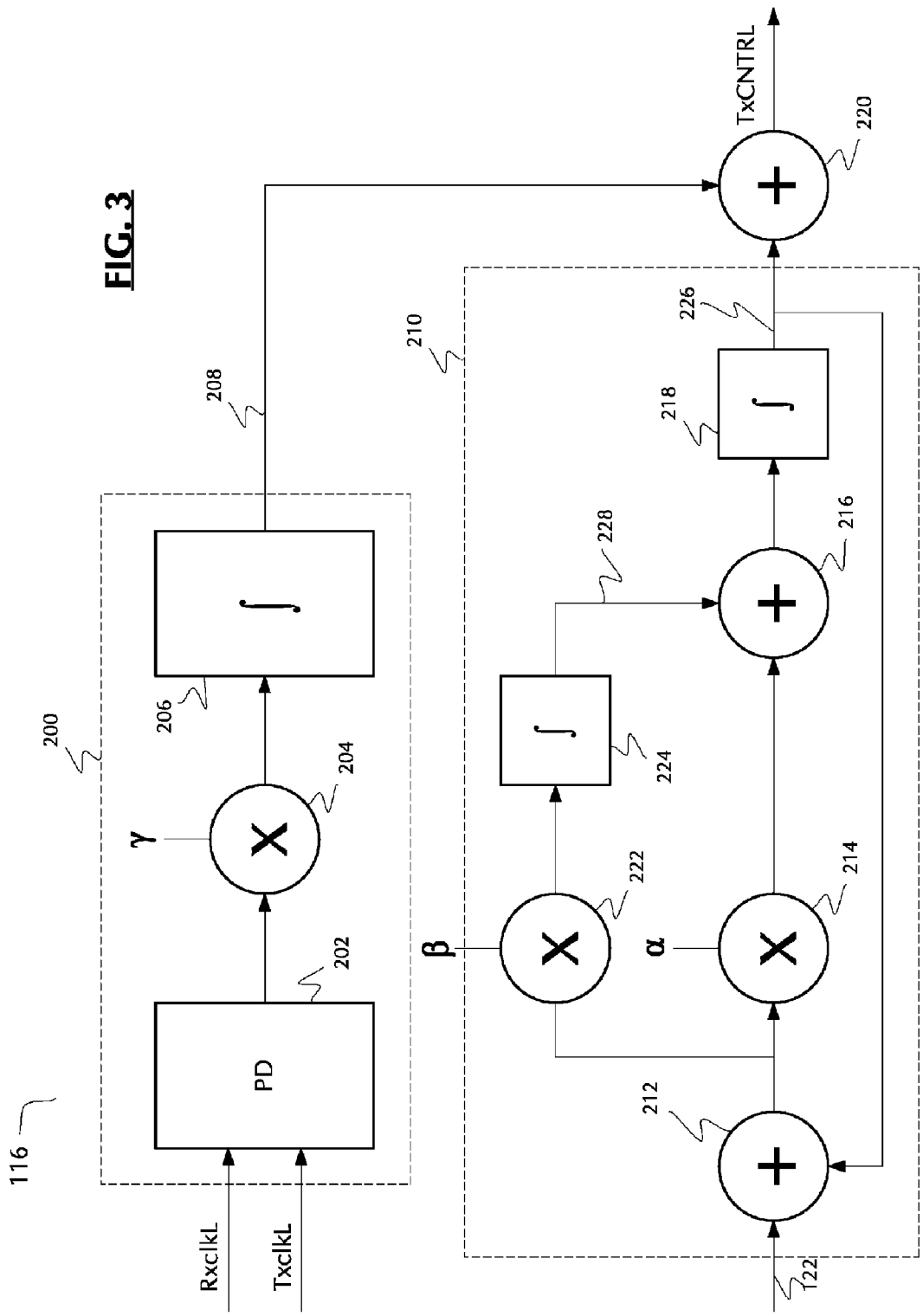
FIG. 3 shows an implementation of the low pass filter of FIG. 2.

Referring back to FIG. 2, low pass filter 116 may be configured to provide the transmitter clock adjustment signal in response to both (i) the recovered clock adjustment signal and (ii) the phase and/or frequency difference between recovered clock signal RxclkL and transmitter clock signal TxclkL As is shown in greater detail in FIG. 3, low pass filter 116 may comprise (a) a clock alignment block 200 configured to determine a phase and/or frequency difference between recovered clock signal RxclkL and the transmitter clock signal TxclkL, and (b) a filter block 210 configured to provide a filtered recovered clock adjustment signal. Low pass filter 116 may further comprise a circuit (e.g., adder 220) configured to generate the transmitter clock adjustment signal from (i) the recovered clock adjustment signal and (ii) the phase and/or frequency difference between the recovered and transmitter clock signals.

Referring again back to FIG. 2, architecture 100 further comprises a 108 transmitter communicatively coupled to low pass filter 116, configured to receive the transmitter clock adjustment signal and transmit the data stream DATA to a destination device 150 in accordance with (or in response to) transmitter clock signal TxclkL In a preferred embodiment, the architecture further includes receiver 104, configured to receive an incoming serial data stream DATA and facilitate recovery of clock signal RxclkL from the data. In one implementation, phase detector 110 is part of receiver 104, and reference signal REF is the incoming data stream DATA.

An Exemplary Circuit

In one aspect, the present invention relates to a circuit, comprising (a) a clock alignment block configured to receive first and second periodic signals and provide a data transfer control signal in response thereto; (ii) a first filter circuit configured to receive first periodic signal information and provide a filtered clock information signal in response thereto; and (iii) a logic circuit configured to mathematically combine the data transfer control signal and the filtered clock information signal and provide an adjustment signal for the second periodic signal in response thereto. In preferred implementations, the inventive circuit is at least part of low pass filter 116 in a repeater, transceiver and/or multiplexer architecture, the first and second periodic signals comprise a recovered clock signal and a transmitter clock signal, and/or the adjustment (or control) signal for the second periodic signal is configured to reduce the difference between the first and second periodic signals.

FIG. 3 shows an exemplary embodiment of low pass filter 116 from FIG. 2, including clock alignment block 200, filter block 210 and adder 220. Clock alignment block 200 generally enables simultaneous recovered/transmitter clock alignment and data filtering. Filter block 210 generally filters the recovered clock adjustment information (which, in a preferred embodiment, comprises a multi-bit digital signal) and enables the transmitter clock to track the frequency of the recovered clock. Adder 220 is an exemplary embodiment of a logic circuit that mathematically combines data transfer control signal 208 and filtered clock information signal 226 to generate an adjustment signal TxCNTRL for adjusting the transmitter clock signal TxclkL When recovered clock signal information 122 comprises a multi-bit digital signal that contains phase and/or frequency information, filter 116 comprises digital circuitry, which is generally less costly to implement and more flexible than corresponding analog circuitry.

The clock alignment block 200 generally comprises a phase detector 202 configured to receive the first and second periodic signals, multiplier 204 and integrator 206. Phase detector 202 generally receives recovered clock signal RxclkL and transmitter clock signal TxclkL, and is configured to align the phases of the two clock signals. Multiplier 204 is preferably a conventional digital filter that multiplies phase and/or frequency difference information from phase detector 202 by a coefficient γ. Preferably, coefficient γ is sufficiently small that data transfer control signal 208 does not overwhelm filtered clock information signal 226. For example, when data transfer control signal 208 and filtered clock information signal 226 each comprise digital signals having a width of 4 or more bits (preferably 6 or more bits), the most significant non-zero bit of data transfer control signal 208 may be no more than 5 bits (and preferably no more than 3 bits) more significant than the most significant non-zero bit of filtered clock information signal 226. Thus, in addition to phase detector 202, clock alignment block 200 may further comprise a filter circuit configured to filter an output of the phase detector 202 and provide the data transfer control signal 208. The output of clock alignment block 200 enables transmitter 108 to use the transmitter clock TxclkL to latch and/or transmit the data (e.g., contained in the signal DATA received by transceiver 100) without first storing it in a FIFO buffer.

Filter block 210 may include a frequency tracking loop, comprising adder 212, multiplier 214, and integrator 218. Preferably, filter block 210 is configured to ensure that transmitter clock TxclkL has (approximately) the same frequency as receiver clock RxclkL Adder 212 is configured to add recovered clock signal information 122 and the filtered clock information signal output from filter block 210. Multiplier 214 is configured to multiply an output of adder 212 by a coefficient α. Multiplier 214 is preferably a conventional digital filter that multiplies frequency tracking information from adder 212 by coefficient α. Preferably, coefficient α is sufficiently small that the bandwidth of the frequency tracking loop remains small (e.g., at or below a predetermined threshold, preferably about or less than a 1/n fraction of the RxclkL and/or TxclkL frequency, where n is an integer of from 2 to 20, more preferably where n is from 4 to 10). Integrator 218 is configured to receive filtered frequency tracking information from multiplier 214 and provide filtered clock information signal 226. Filtered clock information signal 226 is preferably a multi-bit digital information signal (which may be combined with an output from another circuit, as discussed in the following paragraph) configured to adjust transmitter clock signal TxclkL in response to recovered clock information signal 122.

In a preferred embodiment, filter circuit 210 further comprises a phase adjustment circuit configured to receive the output of adder 212 and provide a phase adjustment signal 228 in response thereto. The phase adjustment circuit may comprise a multiplier 222 configured to multiply an output of adder 212 by a coefficient β, and an integrator 224 configured to provide phase adjustment signal 228. Multiplier 222 is preferably a conventional digital filter that multiplies information from adder 212 by a second coefficient β, which may be targeted to adjust the phase of transmitter clock signal TxclkL in response to recovered clock information signal 122. Preferably, coefficient β has characteristics similar to coefficient α (e.g., it is sufficiently small that the bandwidth of the frequency tracking loop remains at or below a predetermined threshold, preferably about or less than a 1/n fraction of the RxclkL and/or TxclkL frequency, where n is an integer of from 2 to 20, more preferably where n is from 4 to 10). Integrator 224 is configured to receive filtered phase information from multiplier 222 and provide phase adjustment signal 228 to a logic circuit (e.g., adder 216) configured to mathematically combine it with filtered frequency tracking information from multiplier 214.

Continuing to refer to FIG. 3, the inventive filter circuit includes a logic circuit (e.g., adder 220) configured to mathematically combine outputs of the phase alignment block 200 and the filter block 210. It is well within the abilities of one skilled in the art to design and use logic configured to provide a mathematically equivalent outcome to that provided by adder 220.

Exemplary Systems and Networks

In a further aspect of the invention, the system comprises the present repeater and/or transceiver architecture, and a receiver communicatively coupled to the clock recovery loop, configured to receive the data and transfer the data to the transmitter. The system may further comprise a clock synthesizer, PLL or other oscillator configured to provide a reference clock signal to the transmitter and the receiver. Furthermore, in a preferred implementation, the system is embodied on a single integrated circuit.

In further embodiments, the receiver may be configured to convert serial data from a network to parallel data for transferring to the transmitter, and the transmitter may be configured to convert parallel data from the receiver to serial data for transmission to a destination device in the network. Thus, the receiver may further comprise a deserializer operating in accordance with the recovered clock signal, and the transmitter may further comprise a serializer operating in accordance with the transmitter clock signal. Each serializer and/or deserializer may comprise a row, bank or array of memory storage elements (such as latches, flip-flops, registers or shift registers) that receive data and that store incoming data in response to the appropriate clock transition or level.

Furthermore, each receiver and/or transmitter in the system may further include (i) a port for communicating with an external device in a network, and/or (ii) an encoder and/or decoder. Such ports may comprise a buffer (such as an input buffer for the receiver and/or an output buffer for the transmitter, and in either case the buffer may be single-ended or differential), voltage level shifter or translator, and/or a single-ended to differential or differential to single-ended data converter. The encoder may comprise, for example, a conventional 8B/10B encoder in the transmitter. The decoder may comprise, for example, a conventional 8B/10B decoder in the receiver.

The system encompasses a multiport repeater, multiplexer and/or transceiver, comprising (1) a plurality of receivers, each coupled to a unique one of a plurality of clock recovery loops, (2) a plurality of transmitters, each coupled to a unique one of a plurality of low pass filters receiving recovered clock information from a corresponding one of the plurality of clock recovery loops, and (3) a plurality of data paths for transferring data from one of the plurality of receivers to one of the plurality of transmitters. The multiport repeater/multiplexer/transceiver may further comprise (i) a plurality of input ports communicatively coupled to the plurality of receivers, (ii) a plurality of output ports communicatively coupled to the plurality of transmitters, and/or (iii) a plurality of data path switches, which may communicatively couple (A) an input or output port to at least a subset of the corresponding plurality of receivers or plurality of transmitters in the multiport repeater/multiplexer/transceiver, or (B) at least a subset of the plurality of receivers to at least a subset of the plurality of transmitters in the multiport repeater/multiplexer/transceiver.

Figure 4:
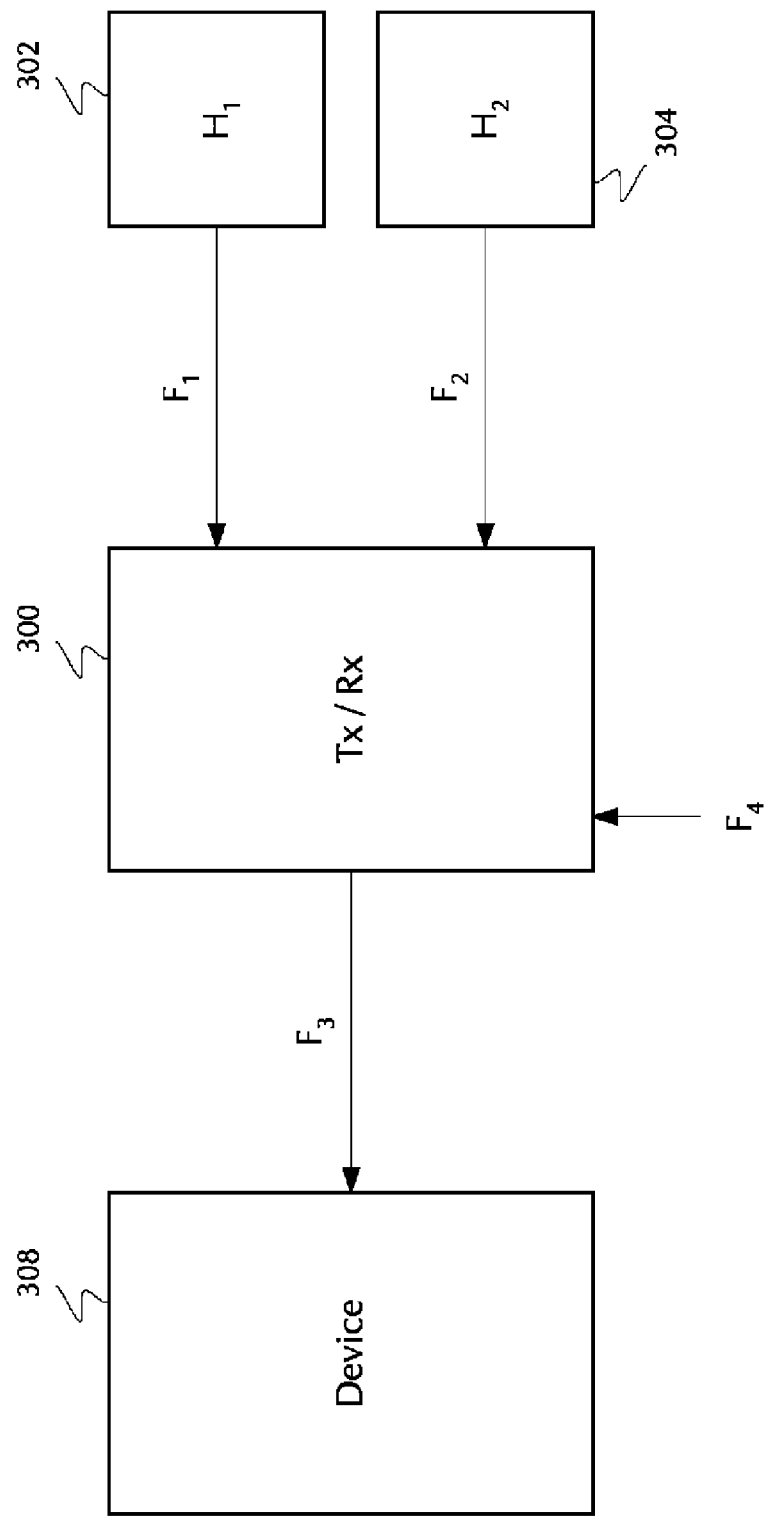
FIG. 4 is a block diagram of a second embodiment of the present invention.

Now referring to FIG. 4, a block diagram of an exemplary multiplexer 300 is shown. Multiplexer 300 may receive serial data from either first host device 302 or second host device 304. First host device 302 operates at a first frequency, second host device 304 operates at a second frequency the same as or different from the first frequency, and multiplexer 300 operates at a third frequency the same as or different from either or both of the first and/or second frequencies. First host device 302, however, generally transmits serial data at a rate $F_1$ typical of conventional high-speed networks; e.g., at least 1 Gb/second, preferably at least 1.5 Gb/second, and more preferably at least 3.125 Gb/second. Second host device 304 generally transmits serial data at a rate $F_2$ that is also typical of conventional high-speed networks, but which may be the same as or different from rate $F_1$. Multiplexer 300 generally transmits serial data at a rate $F_3$ that is also typical of conventional high-speed networks, but which may be the same as or different from rate $F_1$ and/or rate $F_2$ (but preferably is the same as at least one of rates $F_1$ and $F_2$). Transmission rate $F_3$ of multiplexer 300 is typically an integer multiple and/or divisor of the multiplexer operation frequency (e.g., the third frequency above, multiplied by M/N, where M and N are both integers). Thus, the present architecture and system are capable of synchronizing data communications across two different time domains, advantageously without need for a FIFO or elastic buffer.

Multiplexer 300 is generally used by a network controller (or conventional logic, such as glue logic, associated with a network controller) to select whether data from first host device 302 or second host device 304 is transmitted to destination device 308. The network controller or glue logic may send a control signal to multiplexer 300, which then activates or enables circuitry receiving data from one of the host devices and deactivates or disables circuitry receiving data from the other host device. As described above at least in part for the present system, such circuitry typically includes one or more switches between (1) each port receiving data and at least a corresponding one of the plurality of receivers, (2) each clock recovery loop and at least a corresponding one of the plurality of low pass filters, and/or (3) each port transmitting data and at least a corresponding one of the plurality of transmitters. Alternatively, each receiver port-to-transmitter port pathway may be dedicated (i.e., it receives data from only one source device and transmits data to only one destination device), but this arrangement is less preferred in networks where there are a relatively large number of source and destination devices.

A further aspect of the invention concerns a network, comprising (a) a plurality of the present systems; and (b) a plurality of storage or communications devices, wherein each storage or communications device is communicatively coupled to one of the systems. The network may be any kind of known network, such as a storage network (e.g., RAID array), Ethernet, Gigabit Ethernet, or wireless network, but preferably, the network comprises a Gigabit Ethernet network.

The network may include any known storage or communications device, but preferably, at least a plurality of the coupled devices comprise physical layer (PHY) devices, media access control (MAC) devices, optical data modules or other optical devices, and/or network switch or switch fabric devices.

An Exemplary Method

The present invention further relates to method of facilitating data transfer, comprising the steps of: (a) determining a phase difference between a first periodic signal and a second periodic signal, the first periodic signal being recovered from a data stream; (b) adjusting the second periodic signal in response to the phase difference and filtered information from the first periodic signal; and (c) transmitting the data stream in accordance with (or in response to) the adjusted second periodic signal.

In a further embodiment, the method may further comprise the step(s) of (i) receiving the data stream and recovering the first periodic signal therefrom; (ii) transferring data from (A) the data stream or a circuit receiving the data stream to (B) a transmitter configured to transmit serial data to an external device, along a data path that does not include a first-in-first-out (FIFO) memory or an elastic buffer; (iii) filtering phase difference information corresponding to the phase difference between the recovered clock and the transmitter clock; and/or (iv) filtering the recovered clock information.

In the present method, the adjusting step may comprise combining the filtered phase difference information with the filtered information from the recovered clock signal RxclkL As described above, the recovered clock information may comprise recovered clock adjustment information, which may be configured to adjust a phase and/or frequency (preferably at least a phase) of the recovered clock signal. Furthermore, the step of filtering the recovered clock (adjustment) information may further comprise tracking a frequency of the recovered clock signal.

CONCLUSION/SUMMARY

Thus, the present invention provides a circuit, architecture, system and method for facilitating data communications and/or reducing latency in data communications.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of facilitating data transfer, the method comprising:
    determining a phase difference between a first periodic signal and a second periodic signal, said first periodic signal being recovered from a data stream;
    filtering information from said first period signal, said information from said first periodic signal comprising recovered clock adjustment information;
    adjusting said second periodic signal in response to said phase difference and filtered information from said first periodic signal; and
    transmitting said data stream in accordance with said adjusted second periodic signal.

2. The method of claim 1, further comprising receiving said data stream and recovering said first periodic signal therefrom.

3. The method of claim 1, further comprising filtering phase difference information corresponding to said phase difference.

4. The method of claim 3, wherein adjusting said second periodic signal comprises combining said filtered phase difference information with said filtered information from said first periodic signal.

5. The method of claim 1, wherein said recovered clock adjustment information is configured to adjust a phase and/or frequency of said first periodic signal.

6. The method of claim 5, wherein said recovered clock adjustment information is configured to adjust a phase of said first periodic signal.

7. The method of claim 1, wherein said first and second periodic signals comprise a recovered clock signal and a transmitter clock signal.

8. The method of claim 1, further comprising transferring data from said data stream to a transmitter configured to perform said transmitting step along a data path that does not include a first-in-first-out (FIFO) memory or an elastic buffer.

9. A method of facilitating data transfer, the method comprising:
    determining a phase difference between a first periodic signal and a second periodic signal, said first periodic signal being recovered from a data stream;
    adjusting said second periodic signal in response to said phase difference and information from said first periodic signal;
    transferring data from said data stream to a transmitter configured to transmit said data stream along a data path that does not include a first-in-first-out (FIFO) memory or an elastic buffer; and
    transmitting said data stream in accordance with said adjusted second periodic signal.

10. The method of claim 9, further comprising the step of filtering said information from said first periodic signal.

11. The method of claim 10, wherein said information from said first periodic signal comprises recovered clock adjustment information.

12. The method of claim 11, wherein said recovered clock adjustment information is configured to adjust a phase and/or frequency of said first periodic signal.

13. The method of claim 12, wherein said recovered clock adjustment information is configured to adjust a phase of said first periodic signal.

14. The method of claim 9, further comprising receiving said data stream and recovering said first periodic signal therefrom.

15. The method of claim 9, further comprising filtering phase difference information corresponding to said phase difference.

16. The method of claim 15, wherein adjusting said second periodic signal comprises combining said filtered phase difference information with said information from said first periodic signal.

17. The method of claim 9, further comprising filtering said information from said first periodic signal.

18. A method of facilitating data transfer, the method comprising
    determining a phase difference between a first periodic signal and a second periodic signal, said first periodic signal being recovered from a data stream;
    filtering information from said first periodic signal, and tracking a frequency of said first periodic signal;
    adjusting said second periodic signal in response to said phase difference and information from said first periodic signal; and
    transmitting said data stream in accordance with said adjusted second periodic signal.

19. The method of claim 18, further comprising receiving said data stream and recovering said first periodic signal therefrom.

20. The method of claim 18, further comprising transferring data from said data stream to a transmitter configured to perform said transmitting step along a data path that does not include a first-in-first-out (FIFO) memory or an elastic buffer.

21. The method of claim 18, further comprising filtering phase difference information corresponding to said phase difference.

22. The method of claim 21, wherein adjusting said second periodic signal comprises combining said filtered phase difference information with said filtered information from said first periodic signal.

23. The method of claim 18, wherein said information from said first periodic signal comprises recovered clock adjustment information.

24. The method of claim 23, wherein said recovered clock adjustment information is configured to adjust a phase and/or frequency of said first periodic signal.

25. The method of claim 24, wherein said recovered clock adjustment information is configured to adjust a phase of said first periodic signal.

\* \* \* \* \*